(12) United States Patent
Aratani

(10) Patent No.: US 7,137,136 B1
(45) Date of Patent: Nov. 14, 2006

(54) SIGNAL PROCESSING APPARATUS AND METHOD, SIGNAL PROCESSING SYSTEM, AND PRINTER

(75) Inventor: Shuntaro Aratani, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 627 days.

(21) Appl. No.: 09/654,727

(22) Filed: Sep. 5, 2000

(30) Foreign Application Priority Data

Sep. 10, 1999 (JP) .................................. 11-257342

(51) Int. Cl.
  *G06F 3/00* (2006.01)
  *G06F 13/00* (2006.01)
  *H04N 5/445* (2006.01)
  *H04N 7/16* (2006.01)

(52) U.S. Cl. .................. 725/53; 725/58; 725/141; 725/153

(58) Field of Classification Search ............ 725/37–61, 725/133, 141, 153, 135
See application file for complete search history.

(56) References Cited

U.S. PATENT DOCUMENTS

| 4,787,063 A * | 11/1988 | Muguet ..................... 386/83 |
| 5,323,234 A * | 6/1994 | Kawasaki .................. 725/141 |
| 5,640,193 A * | 6/1997 | Wellner ..................... 725/100 |
| 5,699,107 A * | 12/1997 | Lawler et al. ................ 725/58 |
| 5,867,226 A * | 2/1999 | Wehmeyer et al. ........... 725/46 |
| 5,870,150 A * | 2/1999 | Yuen .......................... 725/39 |
| 6,463,585 B1 * | 10/2002 | Hendricks et al. ............ 725/35 |
| 6,591,421 B1 * | 7/2003 | Sullivan ..................... 725/50 |
| 6,614,987 B1 * | 9/2003 | Ismail et al. ................ 386/83 |
| 2003/0035647 A1 * | 2/2003 | Son et al. .................... 386/83 |
| 2004/0205817 A1 * | 10/2004 | Soma et al. ................. 725/50 |

* cited by examiner

*Primary Examiner*—John Miller
*Assistant Examiner*—John Manning
(74) *Attorney, Agent, or Firm*—Cowan, Liebowitz & Latman, P.C.

(57) ABSTRACT

A signal processing apparatus has a search unit for searching input program information in accordance with a predetermined search condition, an assignment unit for assigning a code to a program corresponding to the program information searched by the search unit, and a processing unit for executing a process for the program in accordance with the code assigned by the assignment unit.

2 Claims, 22 Drawing Sheets

PRINT RESULT MANAGING TABLE

| CODE | ACTION | PROGRAM NAME | TIME OF DAY | CH | PROGRAM DETAIL | CAST ETC. | SCORE | MEDIA | PRINT GENERATION |
|---|---|---|---|---|---|---|---|---|---|
| 000 | PICTURE RECORDING RESERVATION | AAA | xxxxxx | CS121 | xxxxxx | xxxxxx | xxxxxx | ---- | 1 |
| 001 | PICTURE RECORDING RESERVATION | BBB | xxxxxx | CS130 | xxxxxx | xxxxxx | xxxxxx | ---- | 1 |
| 002 | PICTURE RECORDING RESERVATION | CCC | xxxxxx | BS44 | xxxxxx | xxxxxx | xxxxxx | ---- | 1 |
| : | | | | | | | | | |
| 012 | PICTURE RECORDING RESERVATION | EEE | xxxxxx | BS14 | xxxxxx | xxxxxx | xxxxxx | ---- | 1 |
| 013 | PICTURE RECORDING RESERVATION | FFF | xxxxxx | BS19 | xxxxxx | xxxxxx | xxxxxx | ---- | 1 |
| 014 | PICTURE RECORDING RESERVATION | GGG | xxxxxx | BS22 | xxxxxx | xxxxxx | xxxxxx | ---- | 1 |
| 015 | PICTURE RECORDING RESERVATION | HHH | xxxxxx | CS008 | xxxxxx | xxxxxx | xxxxxx | ---- | 2 |
| 016 | PICTURE RECORDING RESERVATION | III | xxxxxx | CS232 | xxxxxx | xxxxxx | xxxxxx | ---- | 2 |
| 017 | PICTURE RECORDING RESERVATION | JJJ | xxxxxx | BS43 | xxxxxx | xxxxxx | xxxxxx | ---- | 2 |
| : | | | | | | | | | |
| 032 | REPRODUCTION | EEE | xxxxxx | BS14 | xxxxxx | xxxxxx | xxxxxx | ---- | 2 |
| 033 | REPRODUCTION | GGG | xxxxxx | BS22 | xxxxxx | xxxxxx | xxxxxx | ---- | 2 |
| 034 | REPRODUCTION | QQQ | xxxxxx | BS23 | xxxxxx | xxxxxx | xxxxxx | ---- | 2 |
| : | | | | | | | | | |
| 255 | | | | | | | | | |

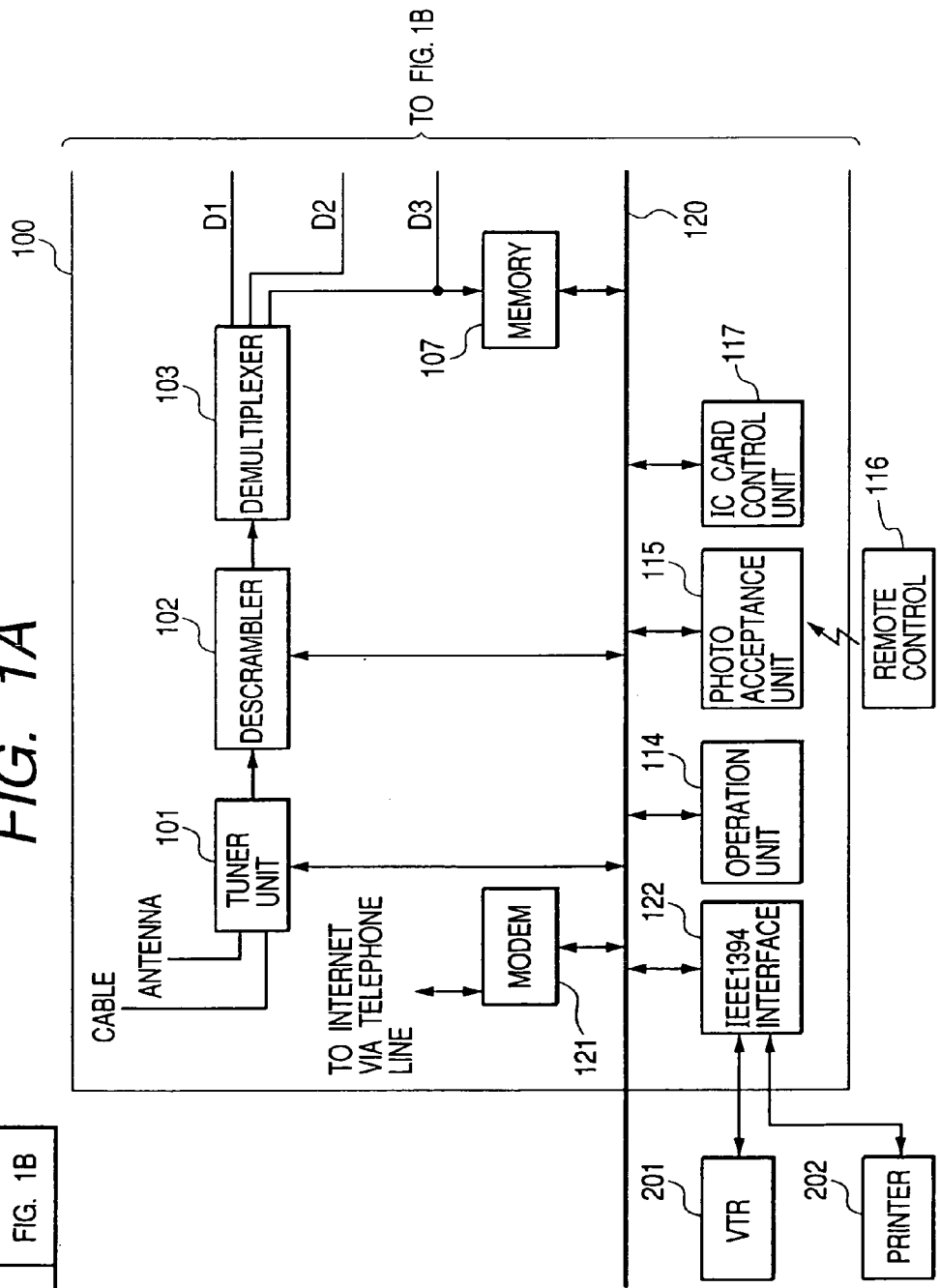

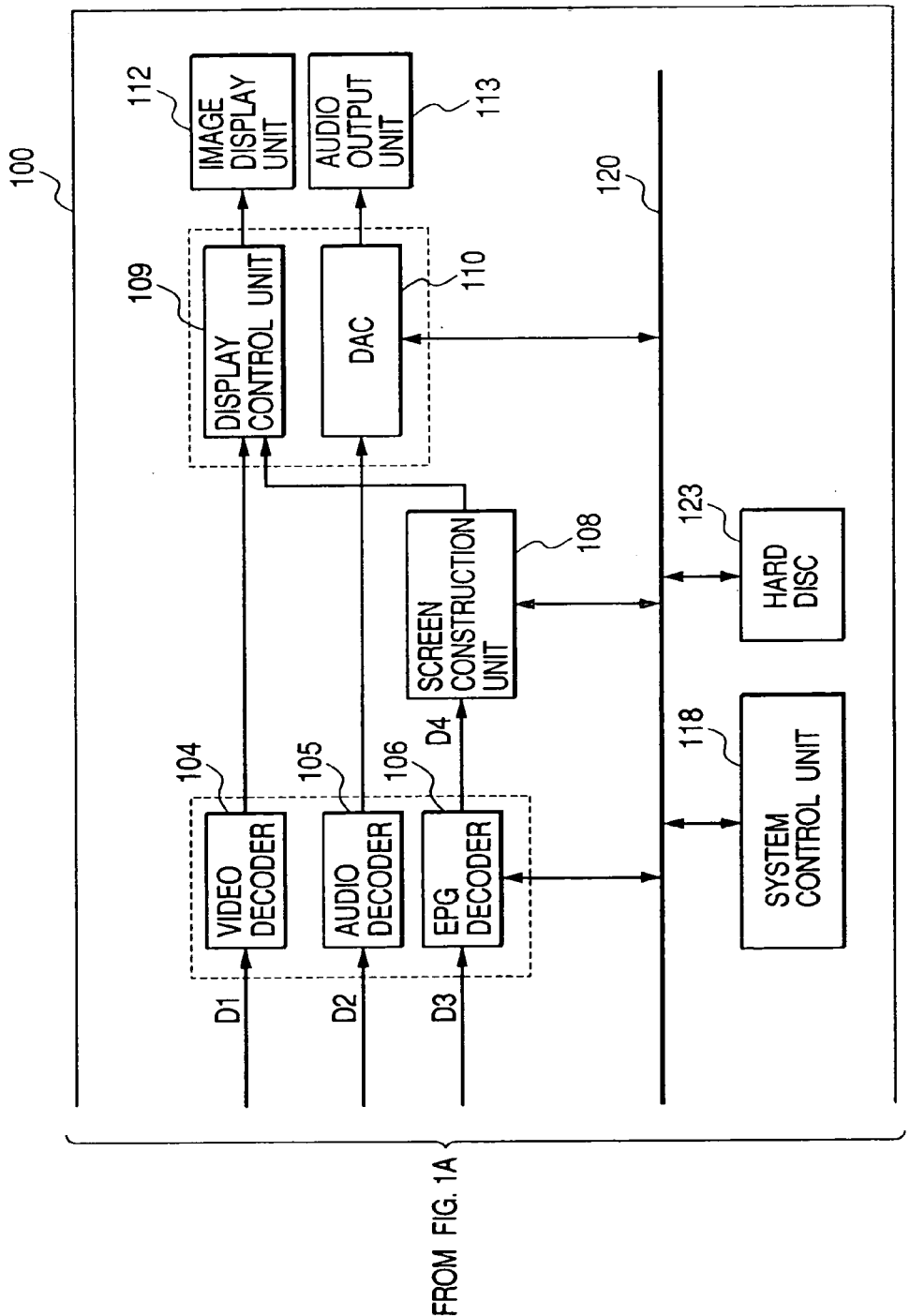

| GUI SOFTWARE a | | | | | |
|---|---|---|---|---|---|
| TUNING CONTROL | PROGRAM INFORMATION EXTRACTING CONTROL | OPERATION INPUT CONTROL | 1394 I/F CONTROL | SCREEN GENERATION | DISPLAY SYNTHESIS CONTROL |
| b | c | d | e | f | g |

FIG. 5

RESERVED/RECORDED PROGRAM TABLE (256 ENTRIES)

| PROGRAM NAME | TIME OF DAY | CH | PROGRAM DETAIL | CAST ETC. | SCORE | MEDIA | STATUS |
|---|---|---|---|---|---|---|---|
| EEE | xxxxxx | BS14 | xxxxxx | xxxxxx | xxxxxx | VTR | RESERVED |
| GGG | xxxxxx | BS22 | xxxxxx | xxxxxx | xxxxxx | VTR | RESERVED |
| | | | ⋮ | | | | |
| | | | | | | | |

FIG. 6

PREFERRED PROGRAM TABLE (15 ENTRIES)

| PROGRAM NAME | TIME OF DAY | CH | PROGRAM DETAIL | CAST ETC. | SCORE |
|---|---|---|---|---|---|
| AAA | xxxxxx | CS121 | xxxxxx | xxxxxx | xxxxxx |
| BBB | xxxxxx | CS130 | xxxxxx | xxxxxx | xxxxxx |
| CCC | xxxxxx | BS44 | xxxxxx | xxxxxx | xxxxxx |

⋮

| PROGRAM NAME | TIME OF DAY | CH | PROGRAM DETAIL | CAST ETC. | SCORE |
|---|---|---|---|---|---|
| EEE | xxxxxx | BS14 | xxxxxx | xxxxxx | xxxxxx |
| FFF | xxxxxx | CS19 | xxxxxx | xxxxxx | xxxxxx |
| GGG | xxxxxx | BS22 | xxxxxx | xxxxxx | xxxxxx |

FIG. 7

PICTURE RECORDING PREFERRED PROGRAM TABLE (5 ENTRIES)

| PROGRAM NAME | TIME OF DAY | CH | PROGRAM DETAIL | CAST ETC. | SCORE |
|---|---|---|---|---|---|
| EEE | xxxxxx | BS14 | xxxxxx | xxxxxx | xxxxxx |
| GGG | xxxxxx | BS22 | xxxxxx | xxxxxx | xxxxxx |
| | | | | | |
| | | | | | |
| | | | | | |

RECOMMENDED PROGRAM (ACTION: PICTURE RECORDING RESERVATION)

| PROGRAM NAME: HHH<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 015 | PROGRAM NAME: III<br>BROADCASTING DATE AND HOUR: xxxx-xxxx<br>CH: CS232<br>CAST ETC.: xxxx, xxxx<br>CONTENT: xxxxxxxx<br>xxxxxxxx<br>CODE: 016 | PROGRAM NAME: JJJ<br>BROADCASTING DATE AND HOUR: xxxx-xxxx<br>CH: BS43<br>CAST ETC.: xxxx, xxxx<br>CONTENT: xxxxxxxx<br>xxxxxxxx<br>CODE: 017 | PROGRAM NAME: KKK<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 018 | PROGRAM NAME: PG11<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 019 |
|---|---|---|---|---|
| PROGRAM NAME: PG12<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 020 | PROGRAM NAME: PG13<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 021 | PROGRAM NAME: PG14<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 022 | PROGRAM NAME: PG15<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 023 | PROGRAM NAME: PG16<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 024 |
| PROGRAM NAME: PG17<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 025 | PROGRAM NAME: PG18<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 026 | PROGRAM NAME: PG19<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 027 | PROGRAM NAME: PG20<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 028 | PROGRAM NAME: PG21<br>BROADCASTING DATE AND HOUR: xxxx-xxxx<br>CH: CS008<br>CAST ETC.: xxxx, xxxx<br>CONTENT: xxxxxxxx<br>xxxxxxxx<br>CODE: 029 |

RECORDED PROGRAM (ACTION: REPRODUCTION)

| PROGRAM NAME: PG1<br>BROADCASTING DATE AND HOUR: xxxx-xxxx<br>CH: BS14<br>CAST ETC.: xxxx, xxxx<br>CONTENT: xxxxxxxx<br>xxxxxxxx<br>CODE: 030 | PROGRAM NAME: PG2<br>BROADCASTING DATE AND HOUR: xxxx-xxxx<br>CH: BS22<br>CAST ETC.: xxxx, xxxx<br>CONTENT: xxxxxxxx<br>xxxxxxxx<br>CODE: 031 | PROGRAM NAME: EEE<br>BROADCASTING DATE AND HOUR: xxxx-xxxx<br>CH: BS14<br>CAST ETC.: xxxx, xxxx<br>CONTENT: xxxxxxxx<br>xxxxxxxx<br>CODE: 032 | PROGRAM NAME: GGG<br>BROADCASTING DATE AND HOUR: xxxx-xxxx<br>CH: BS22<br>CAST ETC.: xxxx, xxxx<br>CONTENT: xxxxxxxx<br>xxxxxxxx<br>CODE: 033 | PROGRAM NAME: QQQ<br>BROADCASTING DATE AND HOUR: xxxx-xxxx<br>CH: BS23<br>CAST ETC.: xxxx, xxxx<br>CONTENT: xxxxxxxx<br>xxxxxxxx<br>CODE: 034 |
|---|---|---|---|---|

FIG. 9

PRINT RESULT MANAGING TABLE

| CODE | ACTION | PROGRAM NAME | TIME OF DAY | CH | PROGRAM DETAIL | CAST ETC. | SCORE | MEDIA | PRINT GENERATION |
|---|---|---|---|---|---|---|---|---|---|
| 000 | PICTURE RECORDING RESERVATION | AAA | xxxxxx | CS121 | xxxxxx | xxxxxx | xxxxxx | ---- | 1 |
| 001 | PICTURE RECORDING RESERVATION | BBB | xxxxxx | CS130 | xxxxxx | xxxxxx | xxxxxx | ---- | 1 |
| 002 | PICTURE RECORDING RESERVATION | CCC | xxxxxx | BS44 | xxxxxx | xxxxxx | xxxxxx | ---- | 1 |
| ... | | | | | | | | | |
| 012 | PICTURE RECORDING RESERVATION | EEE | xxxxxx | BS14 | xxxxxx | xxxxxx | xxxxxx | ---- | 1 |
| 013 | PICTURE RECORDING RESERVATION | FFF | xxxxxx | BS19 | xxxxxx | xxxxxx | xxxxxx | ---- | 1 |
| 014 | PICTURE RECORDING RESERVATION | GGG | xxxxxx | BS22 | xxxxxx | xxxxxx | xxxxxx | ---- | 1 |
| 015 | PICTURE RECORDING RESERVATION | HHH | xxxxxx | CS008 | xxxxxx | xxxxxx | xxxxxx | ---- | 2 |
| 016 | PICTURE RECORDING RESERVATION | III | xxxxxx | CS232 | xxxxxx | xxxxxx | xxxxxx | ---- | 2 |
| 017 | PICTURE RECORDING RESERVATION | JJJ | xxxxxx | BS43 | xxxxxx | xxxxxx | xxxxxx | ---- | 2 |
| ... | | | | | | | | | |
| 032 | REPRODUCTION | EEE | xxxxxx | BS14 | xxxxxx | xxxxxx | xxxxxx | ---- | 2 |
| 033 | REPRODUCTION | GGG | xxxxxx | BS22 | xxxxxx | xxxxxx | xxxxxx | ---- | 2 |
| 034 | REPRODUCTION | QQQ | xxxxxx | BS23 | xxxxxx | xxxxxx | xxxxxx | ---- | 2 |
| ... | | | | | | | | | |
| 255 | | | | | | | | | |

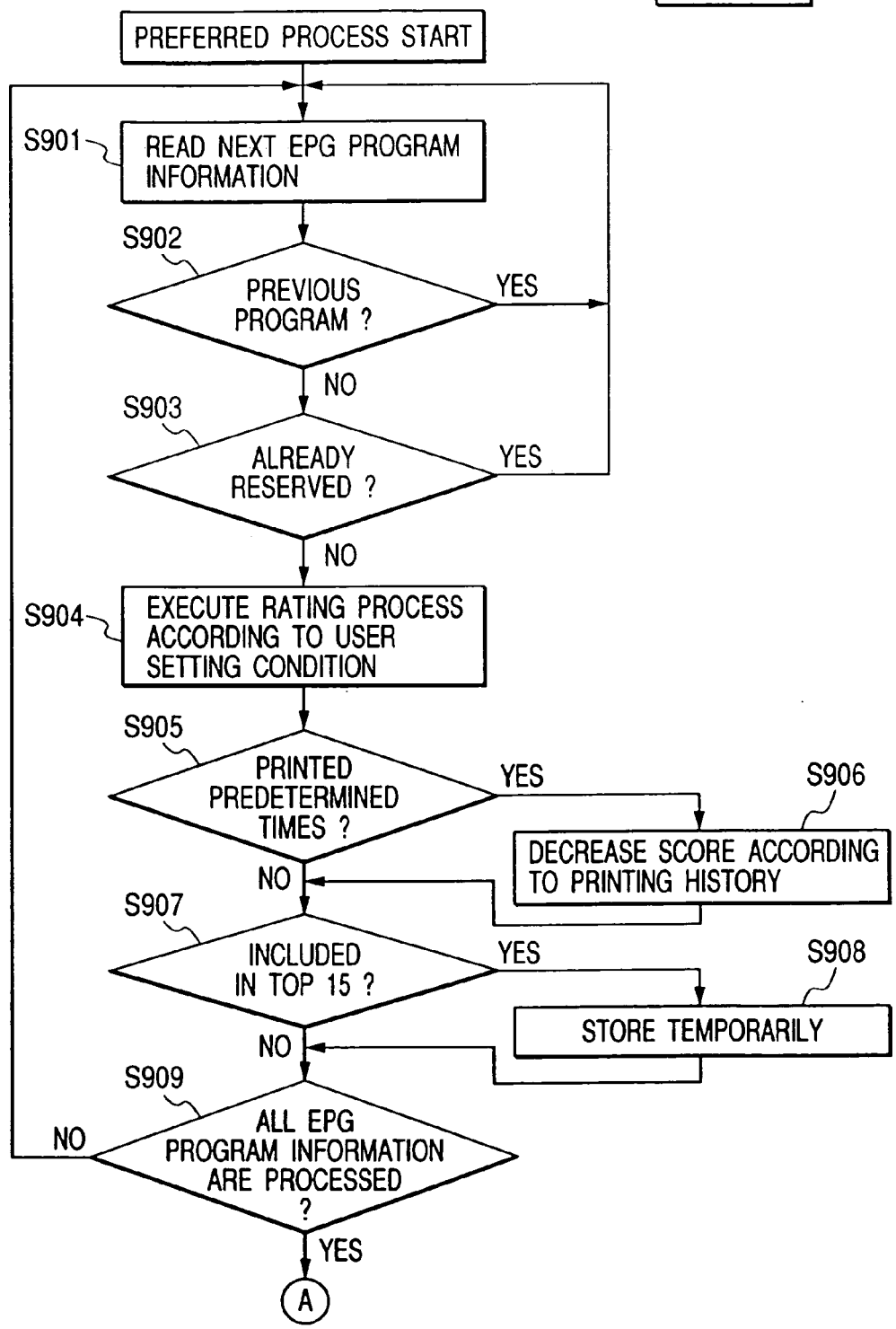

FIG. 11

PICTURE RECORDING
OF PROGRAM "EEE"
HAS BEEN RESERVED

BROAD CASTING DATE
AND HOUR : xxx—xxx

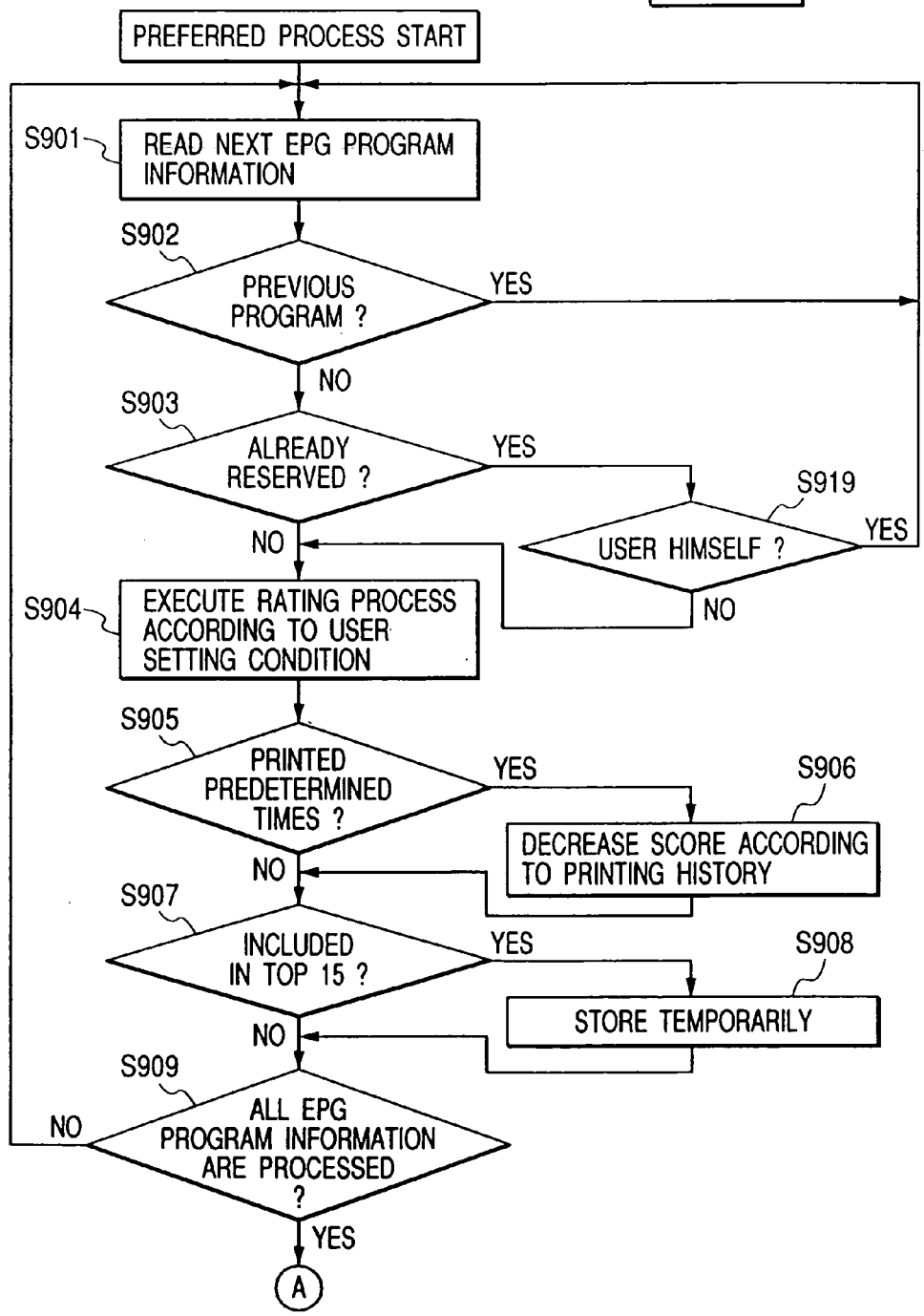

RECOMMENDED PROGRAM (ACTION: PICTURE RECORDING RESERVATION)

FOR USER 1

| PROGRAM NAME: HHH<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 015 | PROGRAM NAME: III<br>BROADCASTING DATE AND HOUR: xxxx–xxxx<br>CH: CS232<br>CAST ETC.: xxxx, xxxx<br>CONTENT: xxxxxxxxx<br>xxxxxxxxx<br>CODE: 016 | PROGRAM NAME: JJJ<br>BROADCASTING DATE AND HOUR: xxxx–xxxx<br>CH: BS43<br>CAST ETC.: xxxx, xxxx<br>CONTENT: xxxxxxxxx<br>xxxxxxxxx<br>CODE: 017 | PROGRAM NAME: KKK<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 018 | PROGRAM NAME: PG11<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 019 |
|---|---|---|---|---|
| PROGRAM NAME: PG12<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 020 | PROGRAM NAME: PG13<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 021 | PROGRAM NAME: PG14<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 022 | PROGRAM NAME: PG15<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 023 | PROGRAM NAME: PG16<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 024 |
| PROGRAM NAME: PG17<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 025 | PROGRAM NAME: PG18<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 026 | PROGRAM NAME: PG19<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 027 | PROGRAM NAME: PG20<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 028 | PROGRAM NAME: PG21<br>BROADCASTING DATE AND HOUR: xxxx–xxxx<br>CH: CS008<br>CAST ETC.: xxxx, xxxx<br>CONTENT: xxxxxxxxx<br>xxxxxxxxx<br>CODE: 029 |

RECORDED PROGRAM (ACTION: REPRODUCTION)

| PROGRAM NAME: PG1<br>BROADCASTING DATE AND HOUR: xxxx–xxxx<br>CH: BS14<br>CAST ETC.: xxxx, xxxx<br>CONTENT: xxxxxxxxx<br>xxxxxxxxx<br>CODE: 030 | PROGRAM NAME: PG2<br>BROADCASTING DATE AND HOUR: xxxx–xxxx<br>CH: BS22<br>CAST ETC.: xxxx, xxxx<br>CONTENT: xxxxxxxxx<br>xxxxxxxxx<br>CODE: 031 | PROGRAM NAME: EEE<br>BROADCASTING DATE AND HOUR: xxxx–xxxx<br>CH: BS14<br>CAST ETC.: xxxx, xxxx<br>CONTENT: xxxxxxxxx<br>xxxxxxxxx<br>CODE: 032 | PROGRAM NAME: GGG<br>BROADCASTING DATE AND HOUR: xxxx–xxxx<br>CH: BS22<br>CAST ETC.: xxxx, xxxx<br>CONTENT: xxxxxxxxx<br>xxxxxxxxx<br>CODE: 033 | PROGRAM NAME: QQQ<br>BROADCASTING DATE AND HOUR: xxxx–xxxx<br>CH: BS23<br>CAST ETC.: xxxx, xxxx<br>CONTENT: xxxxxxxxx<br>xxxxxxxxx<br>CODE: 034 |
|---|---|---|---|---|

FIG. 14A

PREFERRED PROGRAM TABLE (15 ENTRIES)

| PROGRAM NAME | TIME OF DAY | CH | PROGRAM DETAIL | CAST ETC. | SCORE | USER |
|---|---|---|---|---|---|---|
| AAA | xxxxxx | CS121 | xxxxxx | xxxxxx | xxxxxx | 1 |
| BBB | xxxxxx | CS130 | xxxxxx | xxxxxx | xxxxxx | 1 |
| CCC | xxxxxx | BS44 | xxxxxx | xxxxxx | xxxxxx | 1 |
| ... | ... | ... | ... | ... | ... | ... |
| EEE | xxxxxx | BS14 | xxxxxx | xxxxxx | xxxxxx | 1 |
| FFF | xxxxxx | CS19 | xxxxxx | xxxxxx | xxxxxx | 1 |
| GGG | xxxxxx | BS22 | xxxxxx | xxxxxx | xxxxxx | 1 |

FIG. 14B

PICTURE RECORDING PREFERRED PROGRAM TABLE (5 ENTRIES)

| PROGRAM NAME | TIME OF DAY | CH | PROGRAM DETAIL | CAST ETC. | SCORE | USER |
|---|---|---|---|---|---|---|
| EEE | xxxxxx | BS14 | xxxxx | xxxxx | xxxxxx | 1 |
| GGG | xxxxxx | BS22 | xxxxx | xxxxx | xxxxxx | 1 |

FIG. 14C

PRINT RESULT MANAGING TABLE

| CODE | ACTION | PROGRAM NAME | TIME OF DAY | CH | PROGRAM DETAIL | CAST ETC. | SCORE | MEDIA | PRINT GENERATION | USER |
|---|---|---|---|---|---|---|---|---|---|---|
| 000 | PICTURE RECORDING RESERVATION | AAA | xxxxxx | CS121 | xxxxxx | xxxxxx | xxxxxx | ---- | 1 | 2 |
| 001 | PICTURE RECORDING RESERVATION | BBB | xxxxxx | CS130 | xxxxxx | xxxxxx | xxxxxx | ---- | 1 | 2 |
| 002 | PICTURE RECORDING RESERVATION | CCC | xxxxxx | BS44 | xxxxxx | xxxxxx | xxxxxx | ---- | 1 | 2 |
| 012 | PICTURE RECORDING RESERVATION | EEE | xxxxxx | BS14 | xxxxxx | xxxxxx | xxxxxx | ---- | 1 | 2 |
| 013 | PICTURE RECORDING RESERVATION | FFF | xxxxxx | BS19 | xxxxxx | xxxxxx | xxxxxx | ---- | 1 | 2 |
| 014 | PICTURE RECORDING RESERVATION | GGG | xxxxxx | BS22 | xxxxxx | xxxxxx | xxxxxx | ---- | 1 | 2 |
| 015 | PICTURE RECORDING RESERVATION | HHH | xxxxxx | CS008 | xxxxxx | xxxxxx | xxxxxx | ---- | 2 | 1 |
| 016 | PICTURE RECORDING RESERVATION | III | xxxxxx | CS232 | xxxxxx | xxxxxx | xxxxxx | ---- | 2 | 1 |
| 017 | PICTURE RECORDING RESERVATION | JJJ | xxxxxx | BS43 | xxxxxx | xxxxxx | xxxxxx | ---- | 2 | 1 |
| 032 | REPRODUCTION | EEE | xxxxxx | BS14 | xxxxxx | xxxxxx | xxxxxx | ---- | 2 | 1 |
| 033 | REPRODUCTION | GGG | xxxxxx | BS22 | xxxxxx | xxxxxx | xxxxxx | ---- | 2 | 1 |
| 034 | REPRODUCTION | QQQ | xxxxxx | BS23 | xxxxxx | xxxxxx | xxxxxx | ---- | 2 | 1 |
| 255 | | | | | | | | | | |

FIG. 14D

RESERVED/RECORDED PROGRAM TABLE (256 ENTRIES)

| PROGRAM NAME | TIME OF DAY | CH | PROGRAM DETAIL | CAST ETC. | SCORE | MEDIA | USER | STATUS |
|---|---|---|---|---|---|---|---|---|
| EEE | xxxxxx | BS14 | xxxxxx | xxxxxx | xxxxxx | VTR | 1 | RESERVED |
| EEE | xxxxxx | BS14 | xxxxxx | xxxxxx | xxxxxx | VTR | 3 | RESERVED |
| GGG | xxxxxx | BS22 | xxxxxx | xxxxxx | xxxxxx | VTR | 1 | RECORDED |
| GGG | xxxxxx | BS22 | xxxxxx | xxxxxx | xxxxxx | VTR | 2 | RECORDED |
| HHH | xxxxxx | CS18 | xxxxxx | xxxxxx | xxxxxx | VTR | 2 | REPRODUCED |
| HHH | xxxxxx | CS18 | xxxxxx | xxxxxx | xxxxxx | VTR | 3 | RECORDED |
|  |  |  |  |  |  |  |  |  |

FIG. 16

PICTURE RECORDING OF
PROGRAM "GGG" HAS BEEN
ALREADY RESERVED

FIG. 17A

- PLEASE MOVE CURSOR TO RECOMMENDED PROGRAM LIST YOU WANT TO SET, AND DEPRESS "DETERMINE" BUTTON

1701 — ☑ GENERAL INDEX
☐ GENRE
☐ CAST
☐ CHANNEL
☐ TIME

EVERY DAY 6:00
· SHOW-BIZZY NEWS
· DRAMA * FAVORITE 50
· FOREIGN MOVIE * FAVORITE 100

EVERY DAY 17:00
· VARIETY * TALENT 00
· SPORTS * GENERAL
· NEWS * ECONOMY

1702 — DETERMINE

FIG. 17B

- PLEASE SET DATE AND TIME TO PRINT [GENERAL INDEX ▼] 1703
PROGRAM LIST

1704

☑ EVERY DAY [6 ▽] HOUR [00 ▽] MINUTE
[— ] HOUR [— ▽] MINUTE

☑ EVERY WEEK [SUN ▽] DAY [21 ▽] HOUR [00 ▽] MINUTE
[— ▽] DAY [— ▽] HOUR [— ▽] MINUTE

1707 — (RESET) [BACK] [DETERMINE] — 1702
1706

FIG. 17C

- PLEASE SELECT YOUR FAVORITE(S) TO PREPARE [GENERAL INDEX ▼] — 1703
  PROGRAM LIST TO REGISTER

| | | | | | |
|---|---|---|---|---|---|
| NEWS | ☐ GENERAL | ☐ POLITICS | ☐ ECONOMY | ☐ SOCIETY | |
| | ☐ SHOW-BIZZY | ☐ SPORTS | ☐ HOME | ☐ CORPORATION | [DETAIL] |
| DRAMA | ☐ GENERAL | ☐ CONTINUOUS | ☐ SINGLE | ☐ SUSPENSE | |
| | ☐ SUMURAI DRAMAS | ☐ TRENDY | ☐ COME | ☐ LOVE-ROMANCE | [DETAIL] |
| FOREIGN MOVIE ▼ | ☐ GENERAL | ☐ FOREIGN MOVIE | ☐ JAPANESE MOVIE | ☐ ACTION | |
| | ☐ LOVE-ROMANCE | ☐ SF | ☐ SUMURAI DRAMAS | ☐ COMEDY | [DETAIL] |

1708 — FOREIGN MOVIE
1709 — ▼

SELECTED FAVORITE(S) IS SET IN [EVERY DAY 6:00 ▼] PROGRAM LIST 1710    1706 — (RESET)    1707 — [BACK]    1702 — [DETERMINE]

FIG. 18A

JUNE 29, 1998 (SN) 21:00
THIS WEEK RECOMMENDED PROGRAM (GENERAL INDEX)

| DRAMA ○○○○ | FOREIGN MOVIE ××× × | DRAMA △△△△ | SPORTS ○×× × | DRAMA ××△△ |
|---|---|---|---|---|
| ----------- | ----------- | ----------- | ----------- | ----------- |
| ----------- | ----------- |  |  |  |
| PICTURE RECORDING RESERVATION : 012 | ----------- 014 | ----------- | ----------- | ----------- |
| VIEW RESERVATION : 013 | ----------- 015 |  |  |  |
|  |  |  |  |  |
|  |  |  |  |  |

FIG. 18B

JUNE 29, 1998 (SN) 21:00
THIS WEEK RECOMMENDED PROGRAM (DRAMA)

| DRAMA ○○○○ | DRAMA △△△△ | DRAMA ××△△ | DRAMA ×○○× | |
|---|---|---|---|---|
| ----------- | ----------- | ----------- | ----------- | |
| ----------- | ----------- |  |  | |
| PICTURE RECORDING RESERVATION : 012 | ----------- | ----------- | ----------- | |
| VIEW RESERVATION : 013 | ----------- |  |  | |
|  |  |  |  | |
|  |  |  |  | |

SIGNAL PROCESSING APPARATUS AND METHOD, SIGNAL PROCESSING SYSTEM, AND PRINTER

BACKGROUND OF THE INVENTION

1. Field of the Invention

The present invention relates to a signal processing apparatus, and more particularly to a signal processing apparatus having a plurality of processing means for performing a plurality of functions.

2. Related Background Art

In present digital satellite TV broadcasting using communication satellites, electric program guide (EPG) data is transmitted together with video data and the like for subscriber services. Also in future digital satellite TV broadcasting using broadcast satellites or in ground wave digital TV broadcasting, similar services are expected (hereinafter, digital satellite TV broadcasting and ground wave digital TV broadcasting are collectively called "digital TV broadcasting").

A TV receiver received EPG data displays the program information on its display unit or on an external display apparatus. A user selects a desired program from the displayed program information to automatically switch between programs or reserve a program or record a program in a recording unit connected to the TV receiver.

Digital TV broadcasting can broadcast several hundreds of channels. It is difficult for a user to find a desired program from such a very large number of programs. If EPG data is searched in accordance with the search conditions set by a user or if desired programs are registered as preferred programs, the user can find the desired program easily.

In analog TV-broadcasting, compressed reservation codes are used in practice in order to facilitate a program reservation. With this method, a program can be reserved only by entering a specific code from a remote controller, the specific code being written in each program frame of a TV program column of a newspaper, a magazine or the like. This reservation code contains compressed information such as a program date and time, a broadcasting time, and a channel. A program reservation can be made by entering a number having several digits.

For the program selection, program reservation, program search and the like by using an EPG screen, however, it is necessary to perform a complicated user operation such as a screen change, a screen scroll and the like by using a cursor key, an enter key and the like.

If an EPG screen, a program reservation setting screen or the like occupies a large area of the display, a user is disturbed by this screen to listen and view the program. If while one user listens or views a program, another user wants to display such screen, the user listening or viewing the program is disturbed.

With the program reservation method using a reservation code, the number of digits of each reservation code is large. Specifically, if a program has a broadcast start and end time such as 6:02 to 6:58, the number of digits increases and the input work is not easy.

SUMMARY OF THE INVENTION

Under the above-described circumstances, it is an object of the present invention to provide a signal processing apparatus and method having a plurality of functions, capable of easily and reliably performing a control operation for each function without a complicated user operation.

It is another object of the present invention to provide a signal processing apparatus and method capable of easily performing a control operation for a program desired by a user, such as program reservation, program listening/viewing reservation, reproduction, and program detailed information display.

In order to achieve the above objects, an embodiment of the invention provides a signal processing apparatus, comprising: a processing unit for executing a plurality of processes for a plurality of functions; an assigning unit for automatically assigning each process with a code used for executing each of the plurality of processes; and a control unit for controlling the processing unit to execute each of the plurality of processes in accordance with the code assigned by the assigning unit.

Other objects and features of the present invention will become apparent from the following detailed description of embodiments when read in conjunction with the accompanying drawings.

BRIEF DESCRIPTION OF THE DRAWINGS

FIG. 1 is comprised of FIGS. 1A and 1B showing block diagrams illustrating the structure of a digital TV broadcasting receiver to which the invention is applied.

FIG. 5 is a diagram showing an example of a reserved/recorded program table.

FIG. 6 is a diagram showing an example of a preferred program table.

FIG. 7 is a diagram showing an example of a recorded/preferred program table.

FIG. 8 is a diagram showing an example of an recommended program list.

FIG. 9 is a diagram showing an example of a print result managing table.

FIG. 11 is a diagram showing an example of a screen of program reservation reception completion confirmation.

FIG. 13 is a diagram showing an example of a recommended program list according to the second embodiment.

FIGS. 14A, 14B, 14C and 14D are diagrams showing examples of tables according to the second embodiment.

FIG. 16 is a diagram showing an example of a confirmation screen for a reserved program according to the second embodiment.

FIGS. 17A, 17B and 17C are diagrams showing examples of recommended program list setting screens.

FIGS. 18A and 18B are diagrams showing examples of printed recommended program lists.

DETAILED DESCRIPTION OF THE PREFERRED EMBODIMENTS

Figures 2, 3:
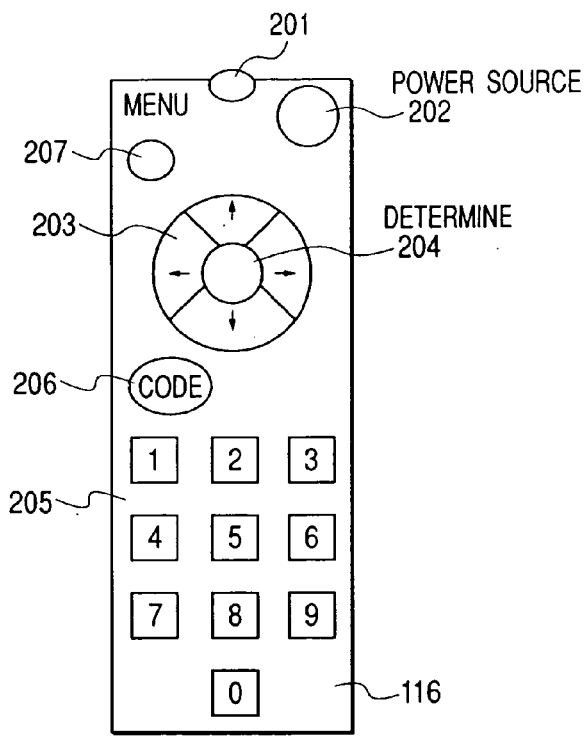
FIG. 2 is a diagram showing an example of a remote controller shown in FIGS. 1A and 1B.
FIG. 3 is a diagram showing the structure of control software used by a system control unit 118.

Embodiments of the invention will be described in detail with reference to the accompanying drawings.

The first embodiment of the invention will be described first. FIGS. 1A and 1B are block diagrams showing the structure of a digital TV broadcasting receiver 100 to which the present invention is applied.

Referring to FIGS. 1A and 1B, a signal received by an unrepresented antenna is input to a tuner unit 101. The tuner unit 101 performs a process such as demodulation and error correction relative to the input signal to generate digital data having a format called a transport stream (TS). The generated transport stream data is output to a descrambler 102.

If the tuner unit 101 inputs TS data scrambled for restricting listening/viewing to the descrambler 102, the descrambler 102 descrambles the TS data in accordance with descramble key information contained in the TS data and key information output from an IC card control unit 117, and outputs the descrambled TS data to a demultiplexer 103.

The IC card control unit 117 receives an IC card which stores user contract information and key information for deciphering the descramble key information contained in the TS data. If the IC card stores the key information for deciphering the descramble key information input from the descrambler 102, the IC card control unit 117 outputs the key information to the descrambler 102.

If the tuner unit 101 outputs TS data not scrambled to the descrambler 102, this TS data is directly output to the demultiplexer 103.

The TS data input from the descramble 102 contains audio and video data, EPG data and the like of a plurality of channels time divisionally multiplexed. The demultiplexer 103 picks up video data D1 and audio data D2 of a presently broadcast program over the channel selected by an operation unit 114 or remoter controller 116, from the input TS Data, and outputs the video data D1 and audio data D2 respectively to a video decoder 104 and an audio decoder 105. The demultiplexer 103 also picks up the EPG data D3 from the TS data and outputs it to a memory 107. The memory 107 stores the EPG data D3 supplied from the demultiplexer 103.

As shown in FIGS. 1A and 1B, each block is connected to a common bus 120.

The TS data is transmitted in the unit of a packet. The head of each packet is added with a packet identification (PID). The demultiplexer 103 reads PID to discriminate among the video data D1, audio data D2 and EPG data D3.

First, the video data will be explained. The video decoder 104 performs an MPEG2 decode process relative to the video data input from the demultiplexer 103, and outputs the decoded video data to a display control unit 109. In response to an operation by the operation unit 114 or remote controller 116, the display control unit 109 processes video data input from the video decoder 104 and screen construction unit 108 to switch between screens and multiplex video data, and displays the processed data on an image display unit 112. The screen construction unit 108 will be later described. The image display unit 112 has unrepresented monitor and video signal input terminals.

Next, the audio data will be explained. The audio decoder 105 performs a MPEG2 decode process relative to the audio data D2 input from the demultiplexer 103, and outputs the decoded audio data to a DAC 110. DAC 110 performs a D/A conversion process relative to the audio data input from the audio decoder 105, and outputs the converted audio data to an audio output unit 113. The audio output unit 113 has an unrepresented speaker and audio signal input terminals.

Then, the EPG data will be explained. Data necessary for constituting the EPG data is transmitted by using the data structure stipulated by "IEC13818-1, MPEG2 SYSTEM", a standard specification "Program Display Information for Digital Broadcasting", by a corporate juridical person, Radio Industrial Association (generally called ARIB), or the like. The main constituent data includes: a service description table (SDT) for transmitting information on configured channels such as a configured channel name and a broadcaster name; a bouquet association table (BAT) for transmitting information on a bouquet (set of configured channels) such as a bouquet name, a contained configured channel; an event information table (EIT) for transmitting information on a program such as a program name, a broadcasting start date and time, and a content description; a time date table (TDT) for transmitting information on a present time and date; and the like.

When a user performs an EPG display operation from the operation unit 114 or remote controller 116, an EPG display instruction from the operation unit 114 or remote controller 116 received by a photo acceptance unit 115 is input to a system control unit 118.

In response to the EPG display instruction input from the operation unit 114 or photo acceptance unit 115, the system control unit 118 reads necessary information from the memory 107 and outputs it to an EPG decoder 106. The EPG decoder 106 performs a decode process relative to the EPG data D3 and outputs the decoded EPG data D4 to the screen construction unit 108.

In accordance with the EPG data D4 input from the EPG decoder 106, the screen construction unit 108 outputs character signals for constructing an EPG screen to the display control unit 109. As described earlier, the display control unit 109 outputs video signals to the image display unit 112 to switch between a video image screen and an EPG screen or perform other operations.

In response to the operation by the operation unit 114 or remote controller 116, the screen construction unit 108 generates a user operation support screen and outputs it to the display control unit 109.

An example of the remote controller 116 is shown in FIG. 2. In FIG. 2, only those operation buttons for realizing a function necessary for the description of this embodiment are shown, and operation buttons necessary for a real TV receiver are not limited only thereto.

In place of the remote controller shown in FIG. 2, a pointing device such as a mouse may also be used.

In FIG. 2, reference numeral 201 represents a photo generation unit for infrared communications between the remote controller 116 and the photo acceptance unit 115 shown in FIG. 1A. Reference numeral 202 represents a power source key for turning on and off a power source. Reference numeral 203 represents cursor keys for moving right and left, and up and down, a selection cursor. Reference numeral 204 represents an enter or determine key for determining an area selection designated by the selection cursor. Reference numeral 205 represents ten-keys for entering a channel number. Reference numeral 206 represents a code input button to be later described, and reference numeral 207 represents a menu button for displaying a menu screen.

The system control unit 118 includes a microprocessor and controls the tuner unit 101, descrambler 102, demultiplexer 103, decoder units 104 to 106, screen construction unit 108, display control unit 109 and DAC 110, in response to an operation by the remote controller 116 or the operation unit 114 having various operation switches for a channel selection, a power turn-ON/OFF and the like.

FIG. 3 shows the structure of control software for the system control unit 118. In FIG. 3, GUI software a is the core of a user interface control process in this embodiment, and other pieces of control software b to g are interface software (driver software) for controlling respective processing circuits shown in FIGS. 1A and 1B.

Figure 4:
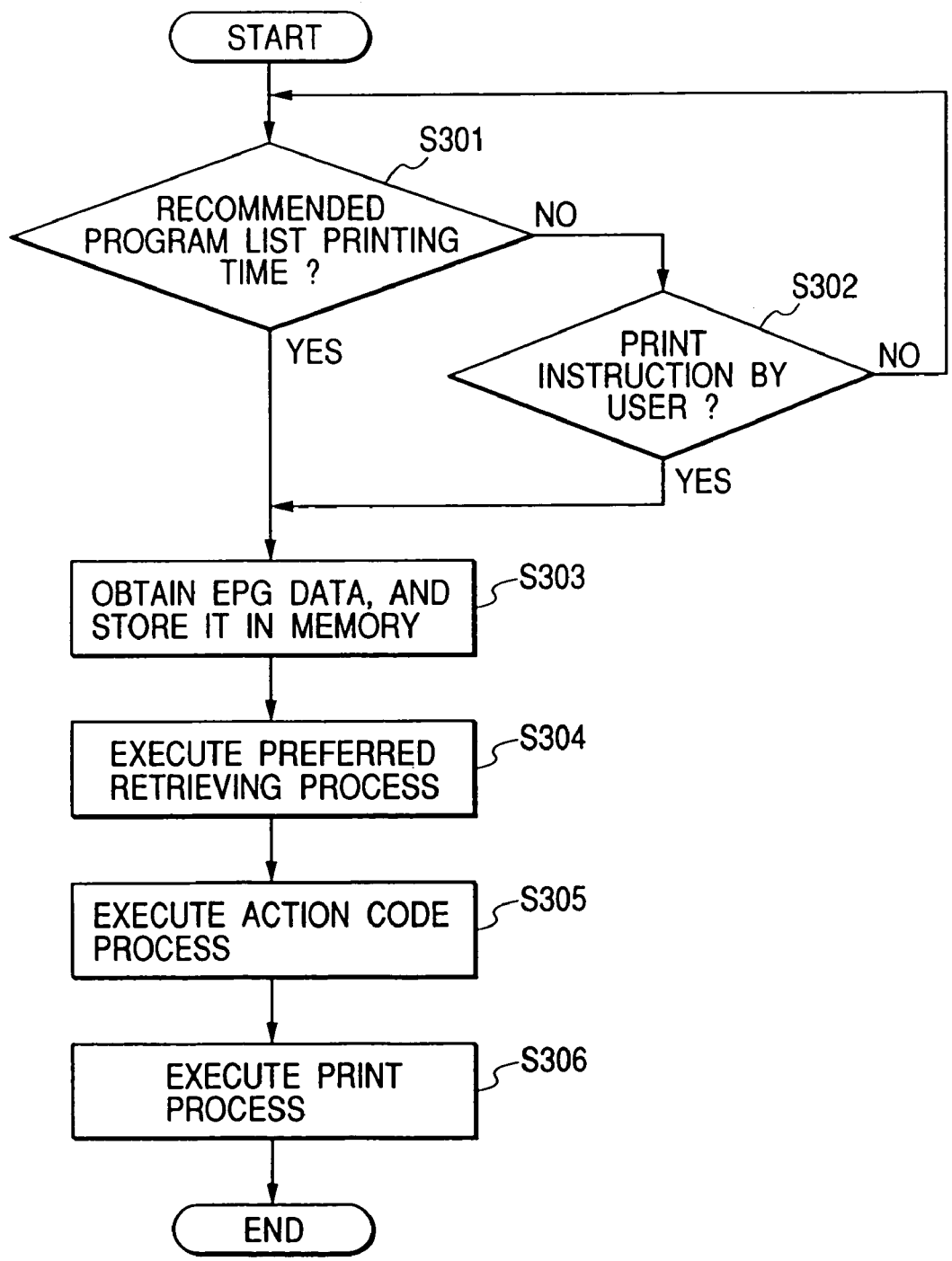
FIG. 4 is a flow chart illustrating an operation to be executed by the system control unit 118 when a recommended program list is printed.

Next, the operation to be executed by the system control unit 118 will be described in detail. FIG. 4 is a flow chart to be executed by the system control unit 118 when a program list is printed.

At Step S301 it is judged whether it is a time to print a recommended program list. If it is a recommended program list printing time, the flow advances to Step S303, whereas if not, it is judged at Step S302 whether a user instructs to print the recommended program list. If instructed, the flow advances to Step S303.

The recommended program list can be set beforehand by a user by using a recommended program list setting screen to be described later.

If a user instructs to print the recommended program list, a list of search conditions for the recommended program list to be printed at a predetermined time to be described later, is displayed on an unrepresented recommended program list selection screen, and the user selects a desired search condition. If a new search condition is to be designated, this condition can be set in an unrepresented search condition setting screen.

At Step S303, the tuner unit 101 is controlled sequentially tune in, and EPG data of each station is acquired via the descrambler 102 and demultiplexer 103 and stored in the memory 107. EPG data of each station contains detailed program information transmitted via the channel of the station. In contrast, so-called minimum program information written in a TV/radio program column of newspapers is transmitted from all stations as information common to all stations.

In this embodiment, EPG data of all programs of one week from currently broadcast programs is acquired and stored in the memory 107.

At Step S304 in accordance with the search conditions set in the recommended program list selection screen and search condition setting screen and in a recommended program list setting screen to be described later, a preferred program search process is executed as will be later described, and the search results are stored in the memory 107. In this case, the preferred program search process is performed relative to programs to be broadcast in the future, written in the EPG data and stored in the memory 107, and relative to programs stored in a reserved/recorded program table (FIG. 5) to be described later. The search results are stored in a preferred program table (FIG. 6) to be described later, 15 programs at the maximum, and in a recorded/preferred program table (FIG. 7) to be described later, 5 programs at the maximum. The details of the preferred program search process will be later described.

At Step S305 an action code generation process is executed. More specifically, the action contents of each program searched by the preferred program search process and stored in the memory 106, and an action code used by a user to perform the action, are determined. The action code is a three-digit number, and programs are sequentially assigned numbers 000 to 255. After the number 255 is assigned, numbers 000 to 255 are again assigned starting from 000.

For example, it is assumed that after the preferred program search process, information of 15 programs is stored in the preferred program table and information of 5 programs is stored in the recorded/preferred program table. Program reservation is selected as the action contents for each program in the preferred program table, and the action code is sequentially assigned by incrementing the last value of the previously assigned code by "1". For example, if the previously assigned code is 014, then action codes 015 to 029 are assigned. Reproduction is selected as the action code for each program in the recorded/preferred program table, and action codes 030 to 034 are assigned.

At Step S306 a print process is executed. In accordance with the action contents and action code (code information) assigned to each preferred program and the program information, print bit map data is generated and at the same time a print layout process is executed. The print layout process rearranges data and adjusts font size and character string length in order to neatly print the data in a designated print sheet, and also adds a head line and print date and time for services to users.

The print bit map data is output to the printer 202 via an IEEE 1394 interface 122. FIG. 8 shows an example of a printed recommended program list. Printed in this recommended program list are the name of each program searched by the preferred program search process, a broadcasting date and time, a channel, a cast, program details, as well as the action contents and action code generated by the action code generation process.

In the print process, at the same time the real printing operation is performed, the print result information is stored. Stored in a print result managing table area the action code, action contents, program name, broadcasting date and time, channel, preferred program search score, print generation information and the like. The print generation information indicates the serial number of print outputs. This serial number is calculated by adding "1" to the print generation of the most recent print output among the program information assigned the same program and action and stored in the print result managing table. If there is no program information assigned the same program and action, the print generation is set to "1". FIG. 9 shows an example of the print result managing table.

Examples of the recommended program list setting screen for setting print data and time and a search condition for the recommended program list will be described with reference to FIGS. 17A to 17C.

In the recommended program list setting screen shown in FIG. 17A, a program list to be set is selected by an operation of the operation unit 114 or remote controller 116, from the lists including a general program list, a genre program list, a cast program list, a channel program list, and a time program list.

A plurality of program lists to be set may be selected. A desired program list item is selected with a selection cursor 1701, a determine button 1702 is depressed to display a check in a check box of the program list item, and thereafter the determine button 1702 is activated to move to the next screen.

The general program list is formed by collecting the search results under a plurality of search conditions. For example, after the search conditions are set in the search condition setting screen shown in FIG. 17C, the preferred program search process is executed in the manner to be described later. Top 15 programs are selected from the search results and used as the general program list. An example of the general program list is shown in FIG. 18A.

The genre program list is formed by registering a preferred genre, setting the search condition for each genre, and using the search results for each genre. After the search condition is set in the search condition setting screen shown in FIG. 17C, the preferred program search process is executed for each genre. Top 15 programs are selected from the search results for each genre and used as the genre program list. An example of the genre program list is shown in FIG. 18B.

The cast program list is formed by registering a preferred cast and using the search results for each cast. The channel program list is formed by registering a preferred channel, setting the search condition for each channel, and executing the preferred program search process. Top 15 programs of the search results are used as the channel program list.

The time program list is formed by setting the search condition for each time period and using the search results for each time period. For example, a genre such as "news" and "sports" is set for a broadcasting time period of 17:00 to 24:00 of each day, a genre such as "drama" and "movie" is set for a broadcasting time period of 21:00 to 24:00 of each day, or a genre such as "variety" and "movie" is set for a broadcasting time period of 23:00 to 27:00 of each day.

In the screen shown in FIG. 17A, while the program list item is selected with the selection cursor 1701, the print date and time and the search condition presently set to the program list item are displayed, whereas if no data is set to the program list item, the message to this effect is displayed.

When the program list item to be set is selected in the screen shown in FIG. 17A, the screen shown in FIG. 17B is displayed. In this screen, the print date and time are set.

In the screen shown in FIG. 17B, the program list for which the print date and time are to be set is selected from the program list item displayed in an area 1703, and a desired date and a time are set in a print date and time setting area 1704.

By an operation of the operation unit 114 or a depression of up/down cursor buttons of the remote controller 116, the program display items to be set and selected in the screen shown in FIG. 17A are sequentially displayed in the area 1703. Also in the print date and time setting area 1704, by a depression of the up/down cursor buttons while the selection cursor is set to areas for setting the day of the week and the time, the day of the week and time are sequentially displayed.

Reference numeral 1706 represents a reset key. When this reset key 1706 is activated, the day of the week and time set in the area 1704 can be reset. Reference numeral 1707 represents a return key. When this return key is activated, the screen shown in FIG. 17A is displayed.

After the print date and time of each program list are set, the determine key 1702 is activated to change to the screen shown in FIG. 17C.

In the screen shown in FIG. 17C, the search condition for each program list is registered. Reference numeral 1708 represents a search condition setting area. By an operation by the operation unit 114 or remote controller 116, a desired search item for each genre is selected to allow the search condition to be registered.

When a detail mark shown in FIG. 17C is activated, an unrepresented detailed condition setting screen appears. In this screen, a finely classified item or a preferred cast can be set as the search condition.

Reference numeral 1709 in FIG. 17C represents a mark indicating that a search condition setting area for each genre is lower than the presently displayed area. This search condition setting area is displayed by an operation of the operation unit 114 or an operation of the up/down cursor keys of the remote controller 116.

In FIG. 17C, reference numeral 1710 represents an area used for setting the search condition set in the presently displayed search condition setting area 1708 to any one of the print dates and times set in the screen shown in FIG. 17B. In this area 1710, by an operation of the operation unit 114 or an operation of the up/down cursor keys of the remote controller 116, the print dates and times set in the screen shown in FIG. 17B are sequentially displayed. A user selects desired date and time.

In the above-described manner, the print date and time and search condition can be set in the recommended program list setting screens shown in FIGS. 17A to 17C.

Figure 10B:
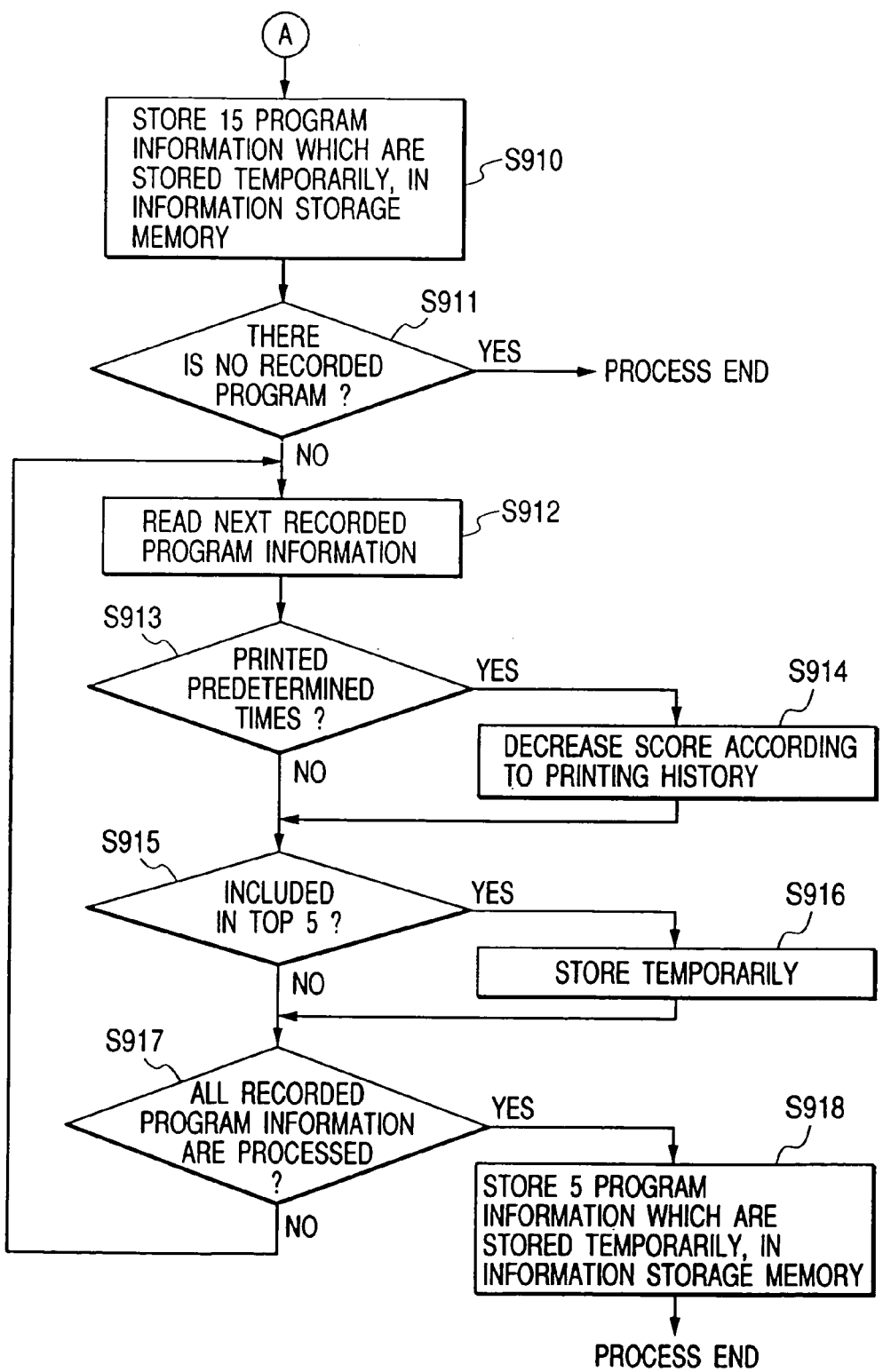
FIG. 10 is comprised of FIGS. 10A and 10B showing flow charts illustrating an operation to be executed by the system control unit 118 during a preferred program search process.

Next, the details of the preferred program search process will be given. FIGS. 10A and 10B are flow charts illustrating the operation to be executed by the system control unit 118 during the preferred program search process.

The preferred program search process is executed first for programs scheduled to be broadcast in the future. Each piece of program information is read from the EPG data stored in the memory 107 (S901) to check whether the program is scheduled to be broadcast in the future (S902). If it is judged that the program is scheduled to be broadcast in the future, it is checked whether the program has already been reserved, by referring to the reserved/recorded program table to be described later (S903). If not reserved, a rating process is executed in accordance with the preferred program search condition (S904).

The preferred program search condition includes: a condition that "a program can be listen and viewed", i.e., a channel or program has been contracted by a user; a condition that a program satisfies a search condition set as described previously for the recommended program list, e.g., the program satisfies the search condition such as "preferred genre" and "preferred talent"; a condition that a program satisfies a listening/viewing history condition such as "a program was listened and viewed for 3 minutes or longer or recorded in the past one month"; and other conditions. For a program satisfying the preferred program search condition, a predetermined score is added for each search condition, and a total sum of scores is used as a preferred program score.

For example, if a program can be listened and viewed, 20 points are added, if a program satisfies the preferred genre, 5 points are added, if a program satisfies a preferred talent, 10 points are added, if a program was listened and viewed for 3 minutes or longer or recorded in the past, 8 points are added. The total sum of these points are used as the preferred program score.

Although a program was included in the recommended program list in the past and this program list was printed out several times, if the program was not reserved, a process of suppressing this program from being entered in the preferred program search results is also executed. The past print history is checked from the print result managing table stored in the memory 107, and it is judged-whether the number of past print outputs is predetermined times or more (S905). If predetermined times or more, a constant value depending on the number of past print outputs is subtracted from the preferred program score (S906). If the number of past print outputs is smaller than the predetermined times, the flow advances to Step S907.

In this embodiment, in order to print out 15 programs having a high preferred program score at the maximum, it is judged whether the calculated preferred program score is contained in top 15 programs (S907). If contained, this program information is temporarily stored in the memory 107 (S908). This temporary memory 107 can be rewritten and always store the program information of the top 15 programs. If the preferred program score is not contained in the top 15 programs, the flow advances to Step S909.

At Step S909 it is checked whether the preferred program search process has been executed for all programs contained in the EPG data stored in the memory 107. If it is judged that the preferred program search process has not been executed for all programs, the flow returns to Step S901 whereat information on the program still not processed is read from the memory 107, whereas if it is judged that the preferred program search process has been executed for all programs, information of the 15 programs temporarily stored in the memory is stored in the preferred program table (S910).

The preferred program search process is executed next for recorded programs. At Step S911 a status parameter in the reserved/recorded program is checked to check whether there is a recorded program. If there is a recorded program, information on the recorded program is read from the print result managing table (S912). If there is no recorded program, the preferred program search process is terminated.

By referring to the action information and print generation information in the read program information, it is checked at Step S913 whether the program was printed as the reproduction action preferred program predetermined times or more in the past. If the number of past print outputs is predetermined times or more, a constant value depending on the number of past print outputs is subtracted from the preferred program score (S914). If the program was not printed predetermined times as the reproduction action preferred program, the flow advances to Step S915.

In this embodiment, in order to print out 5 recorded programs at the maximum, it is judged at Step S915 whether the calculated preferred program score is contained in top 5 programs. If contained, this program information is temporarily stored in the memory 107 (S916). This temporary memory 107 can be rewritten and always store the program information of the top 5 programs. If the preferred program score is not contained in the top 5 programs, the flow advances to Step S917.

At Step S917 it is checked whether the preferred program search process has been executed for all recorded programs contained in the reserved/recorded program table. If it is judged that the preferred program search process has not been executed for all recorded programs, the flow returns to Step S912 whereat information on the recorded program still not processed is read from the reserved/recorded program table, whereas if it is judged that the preferred program search process has been executed for all recorded programs, information of the 5 programs temporarily stored in the memory 107 is stored in the recorded/preferred program table to thereafter terminate the preferred program search process (S918).

Next, an action execution process will be described. In accordance with the printed recommended program list, a user operates the operation unit 114 or depresses the code button of the remote control 116, and thereafter the user inputs an action code. In response to this, the system control unit 118 reads the program and action contents corresponding to the input action code, from the print result managing table stored in the memory 107, and executes the action execution process in accordance with the read action contents.

For example, if a user inputs a code 012, the system control unit 118 judges from the print result managing table shown in FIG. 9 that the action to be executed is to reserve the program "EEE" scheduled to be broadcast in the future, and controls the screen construction unit 108 and display control unit 109 in order to display a confirmation message such as shown in FIG. 11.

Information on the reserved program is read from the print result managing table and stored in the reserved/recorded program table. FIG. 5 shows an example of the reserved/recorded program table.

A media parameter shown in FIG. 5 includes identification information on a medium in which the program is recorded, i.e., information such as a recording apparatus which actually records the program and a storage location. For example, if the recording apparatus is a VTR, stored as the media parameters are a type of the apparatus defined by the Audio Video Control (AV/C) specification, a product identifier ID, a tape ID, a tape location and the like.

As a medium in which the program is recorded, VTR 201 is set as a default. The type of VTR 201, and product identifier ID are stored as the media parameters in the reserved/recorded program table when the program is reserved. Information on the tape ID and tape location is stored when the reserved program starts being recorded.

The medium may be changed by a user operation. In place of VTR 201, an inner memory, a hard disk 123, or another externally connected recording apparatus may also be used.

When it becomes the start or end time of the reserved program stored in the reserved/recorded program table, the system control unit 118 instructs the tuner unit 101 to set a channel and VTR 201 to start or end the recording of the program.

For example, when it becomes the start time of the program "EEE" shown in FIG. 5, the system control unit 118 issues a channel change command to the tuner unit 101 to change the channel to BS14, and transfers a record start command to VTR 201 via the IEEE 1394 interface 122. Since VTR 201 used in this embodiment is in conformity with the AV/C specification, the system control unit 118 transfers a "Record" command defined by the AV/C specification to VTR 201.

After the record process is completed, the system control unit 118 transfers a record stop command to VTR 201 via the IEEE 1394 interface 122, and changes the status parameter in the reserved/recorded program table shown in FIG. 5 from "reserved" to "recorded".

After the program record process is completed, if a user inputs, for example, a code 033 by an operation of the operation unit 114 or remote controller 116, the system control unit 118 judges from the table shown in FIG. 9 that the action to be executed is to reproduce the program "GGG", searches the program name "GGG" from the reserved/recorded program table shown in FIG. 5, and in accordance with the media parameter of this program "GGG", controls VTR 201 to wind backward (or feed fast) and reproduce the program.

The status parameter in the reserved/recorded program table is then changed from "recorded" to "reproduced". The reserved/recorded program table can store information of 256 programs. If information to be stored exceeds this capacity, the reproduced programs or programs recorded older than a predetermined time are sequentially deleted. In this case, an unrepresented deletion confirmation screen is displayed on the image display unit 112.

As above, in this embodiment, a code is assigned for a program reservation or a reproduction operation for each program desired by a user. Therefore, the program reservation or reproduction operation can be performed by a simple user operation.

Also in this embodiment, information on preferred programs is printed out together with a program reservation code and a program reservation is effected by inputting the code. Accordingly, it is not necessary to display a program list on the screen, so that a program selection and program reservation can be effected without hindering program listening/viewing.

Also in this embodiment, the signal processing apparatus assigns a preferred program with a specific code. It is therefore possible to reduce the number of codes, so that the program reservation and reproduction operation can be effected with a simple user operation.

Also in this embodiment, the preferred program search process is executed by reflecting the print history of programs upon the search process. It is therefore possible to exclude the program from the search object, because although it was printed in the past, the user does not prefer it. Programs preferred by a user can be searched from more search candidates.

Also in this embodiment, the program list is printed out. Therefore, a larger amount of detailed information can be printed out at a time than the program list is displayed, and a user can confirm the program contents easily.

In this embodiment, although a recommended program list is automatically printed, the recommended program list may be displayed on the display screen. In this case, the operation unit 114 or remote controller 116 is provided with a print button and as a user depresses the print button to print out a desired program list.

In this embodiment, in the preferred program search process, each program is rated and given a score in accordance with a plurality of search conditions, and programs having higher scores are selected. The embodiment is not limited only to this search method, but a search method using only the past listening/viewing history, a search method using only the search conditions set on the recommended program list setting screen, or other search methods may also be used.

In this embodiment, each program is rated and given a score in accordance with a plurality of search conditions, top 15 programs having higher scores are selected as those scheduled to be broadcast in the future, and top 5 programs having higher scores are selected as those already recorded. The number of programs selected as the search results is not limited only to the above, but it may be a desired number.

In this embodiment, each program is assigned a code of three digits from 000 to 255. The number of digits of the code is not limited only to this range, but the desired number of digits and a desired number range may also be used.

In this embodiment, the preferred program search process and sequential code assignment are performed for both the programs scheduled to be broadcast in the future and the programs already recorded, and the results are printed out at a time. The preferred program search process and sequential code assignment may be performed for ones of the programs scheduled to be broadcast in the future and the programs already recorded, and the results of only ones of the programs may be printed out.

A code is assigned to the program reservation operation for the programs scheduled to be broadcast in the future and to the reproduction operation for the programs already recorded. The operation to be assigned the code is not limited only to these operations, but other optional operations may be used such as a program detailed information display operation for confirming the detailed contents of a program and a listening/viewing reservation operation such as illustrated in FIG. 18A.

Although IEEE 1394 is used for connection to an external apparatus, the embodiment is not limited only thereto, but other bus systems or network systems may also be used.

Although the digital TV receiver of this embodiment has the display unit and speaker, it may be structured to output video and audio signals to an external display unit and speaker.

Although the digital TV receiver of this embodiment is not provided with a recording unit for recording received signals, it may be provided with the recording unit for recording received signals.

Although received signals are recorded in VTR connected to the signal processing apparatus, the embodiment is not limited only thereto, but received signals may be recorded in a built-in memory or hard disk, or in other recording apparatuses.

In this embodiment, although TV signals are used, other signals may also be used such as audio signals, signals supplied via a network.

In this embodiment, the invention is applied to the digital TV receiver. The invention is also applicable to other signal processing apparatuses and systems having a plurality of functions, with similar expected advantageous effects.

For example, the preferred program search process and the action code assignment process may be executed at a server on the network. In this signal processing system, a digital TV receiver receives information (code information) on the assigned action contents and action code corresponding to each program, and in accordance with the action code entered by a user and the code information, a process designated by the user is executed.

Next, the second embodiment of the invention will be described in detail.

A different point from the first embodiment resides in that the preferred program search process, action code generation process, print process and action execution are executed for each of a plurality of users.

The structure of this embodiment is the same as the digital TV receiver of the first embodiment shown in FIGS. 1A and 1B and the operation of each unit is also similar to that of the first embodiment. Therefore, the description thereof is omitted.

The operation to be executed by the system control unit 118 of the second embodiment is also the same as that illustrated in FIG. 4 and so the description thereof is omitted. However, the recommended program print time can be set by each user. For example, if three users set the print time of 07:00, a print operation is performed three times starting at 07:00.

Figure 12B:
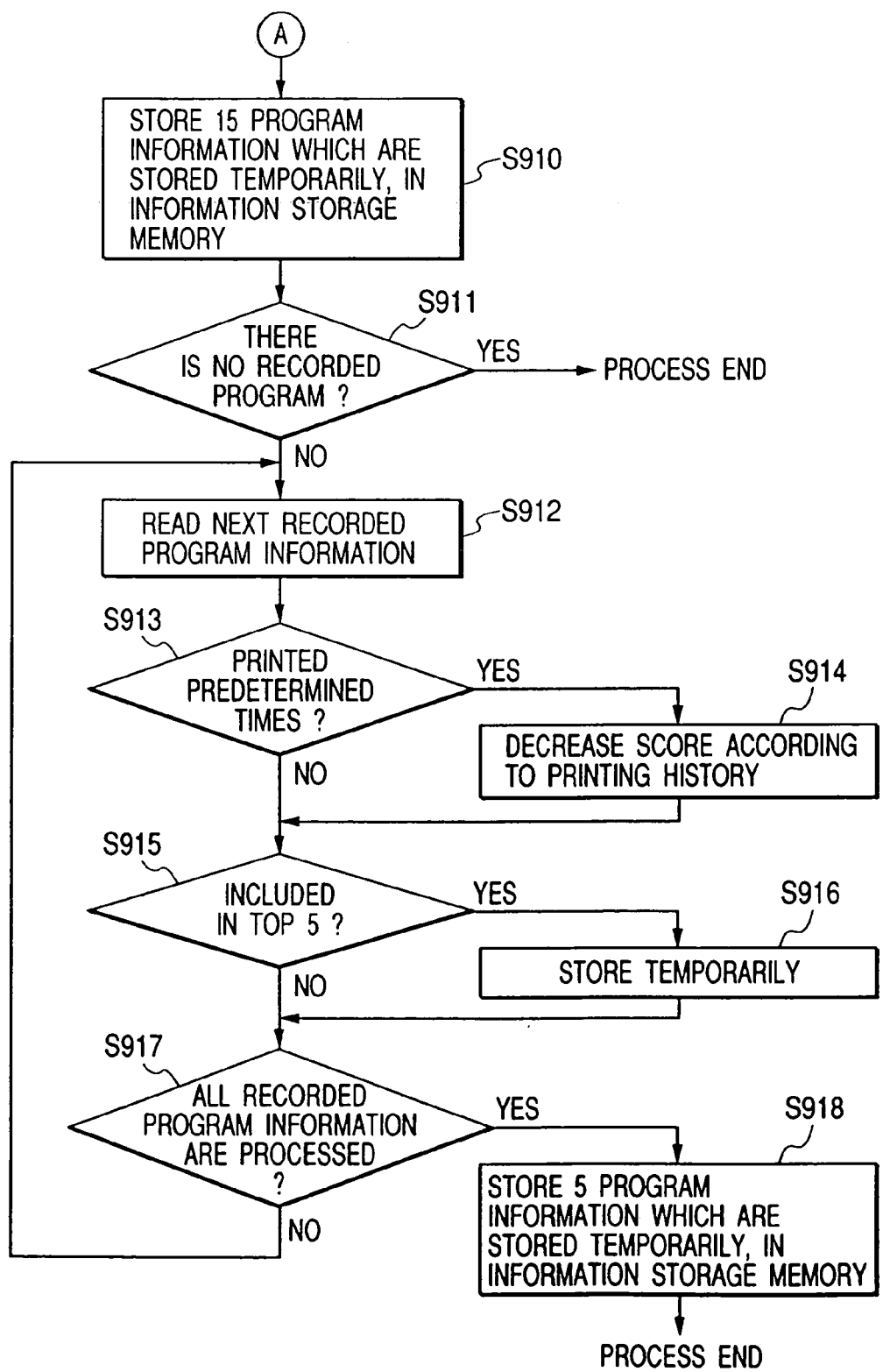
FIG. 12 is comprised of FIGS. 12A and 12B showing flow charts illustrating an operation to be executed by the system control unit 118 during a preferred program search process according to a second embodiment of the invention.

The details of the preferred program search operation will be given. FIGS. 12A and 12B are flow charts illustrating the operation to be executed by the system control unit 118 during the preferred program search process. The operations at Steps S901 to S918 are the same as those at Steps S901 to S918 shown in FIGS. 10A and 10B, and so the description thereof is omitted.

The search conditions for forming the recommended program list are set beforehand by respective users by using the recommended program list setting screen. The set search conditions are stored in the memory 107 shown in FIGS. 1A and 1B.

A user can set a user name. The system control unit 118 assigns each user name a user ID. When the recommended program list is printed out, the user name corresponding to the user ID is printed out on the program list. FIG. 13 shows an example of the recommended program list.

Examples of the preferred program table, recorded/preferred program table, print result managing table and reserved/recorded program table formed and used by the system control unit 118 are shown in FIGS. 14A to 14D. Each table shown in FIGS. 14A to 14D has an user ID parameter field in addition to the contents of each table of the first embodiment.

The operation at Step S919 shown in FIG. 12A will be described. When the preferred program search process is executed for the programs scheduled to be broadcast in the future, although the programs already reserved by another user is used as the search candidate, the programs already reserved by the same user is excluded from the search candidate.

Therefore, at Step S903 by referring to the reserved/recorded program table shown in FIG. 14D, it is checked whether the same program is already reserved. If it is judged that the same program is already reserved, the user ID is confirmed to check whether the user presently executing the preferred program search process is the same user reserved the program (S919).

If it is judged that the user is the same user, the program is excluded from the search candidate, and the flow returns to Step S901. If it is judged that the user is not the same user, the program is used as the search candidate and the flow advances to Step S904.

In the operation at Steps S905 and S913 of reducing the preferred program score in accordance with the number of past print outputs, the user ID in the print result managing table is confirmed and the score is reduced in accordance with the number of past print outputs made for the user executing the preferred program search process.

Figure 15:
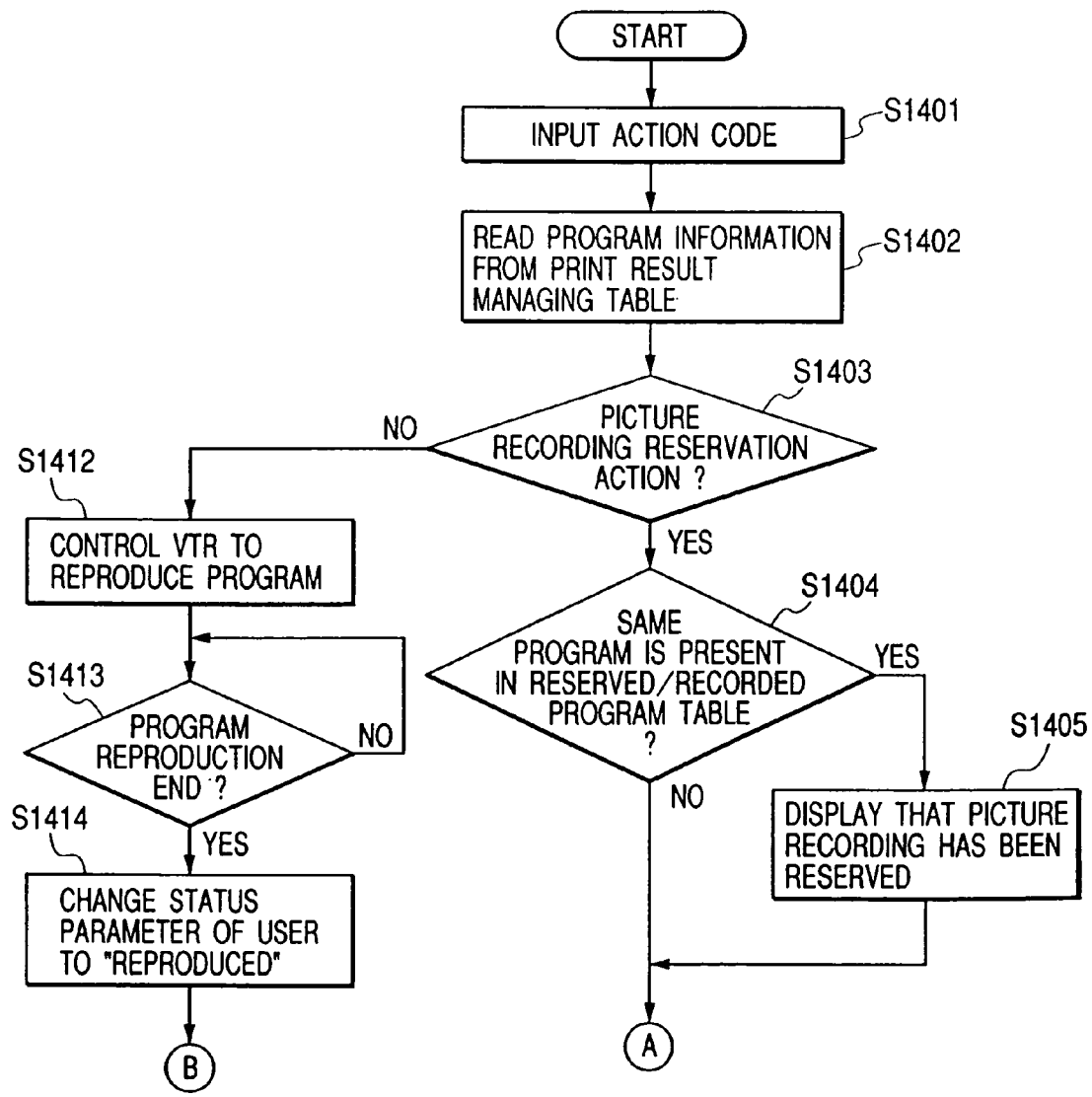
FIG. 15 is comprised of FIGS. 15A and 15B showing flow charts illustrating an operation to be executed by the system control unit 118 during an action execution process according to the second embodiment.
Figure 15B:
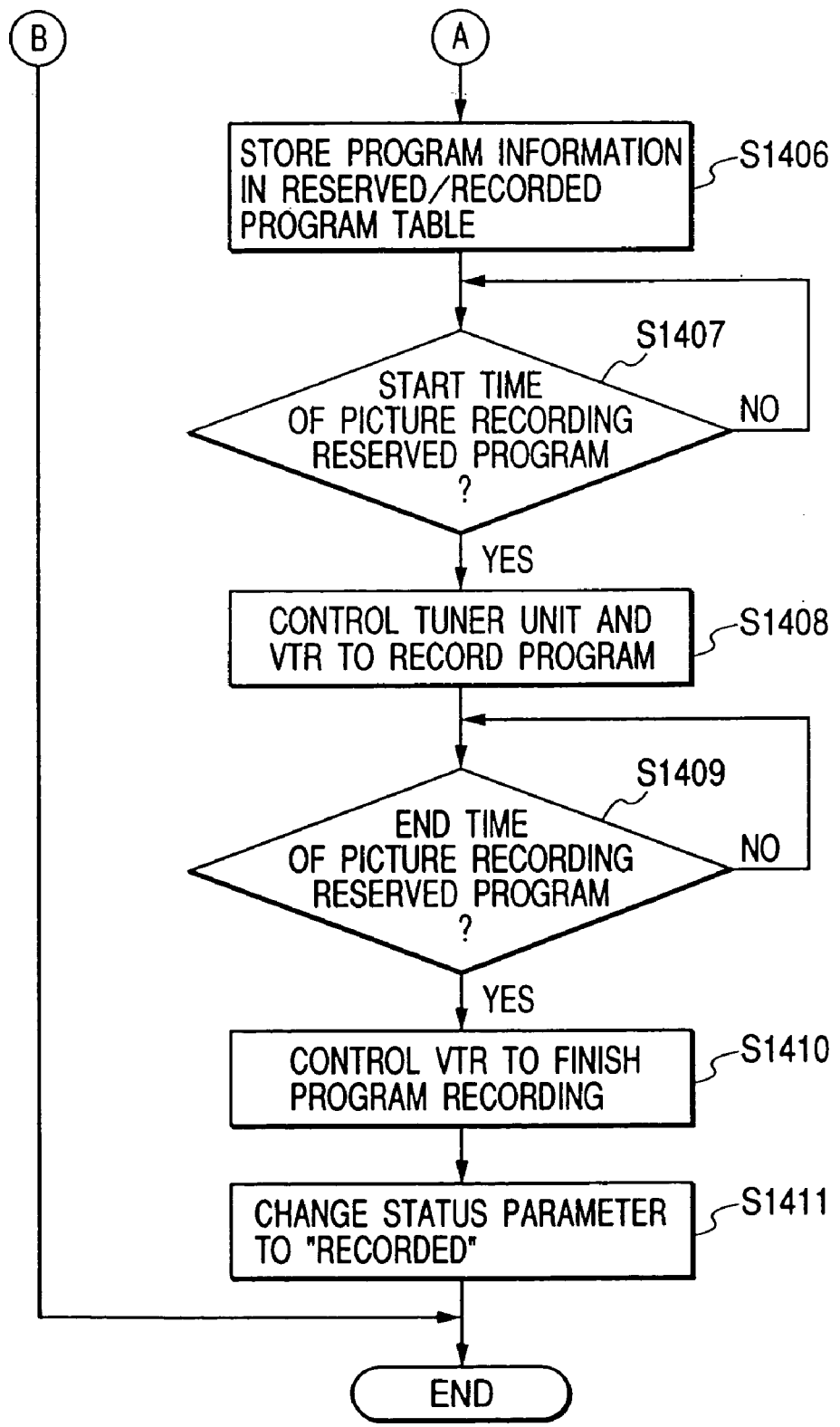

Next, the action execution process will be described. FIGS. 15A and 15B are flow charts illustrating the operation to be executed by the system control unit 118 during the action execution process.

When an action code is input by a user (S1401), pieces of the program information of the program corresponding to the input action code are read from the print result managing table stored in the memory 107 (S1402). It is judged from the read program information whether the action corresponding to the action code is program reservation (S1403).

If it is judged at Step S1403 that the action is program reservation, it is checked whether the reserved/recorded program table contains the same program, i.e., whether the program was already reserved (S1404). If it is judged that the action is not program reservation, the flow advances to Step S1412.

If it is judged at Step S1404 that the program was already reserved, the user ID corresponding to the program is confirmed by referring to the reserved/recorded program table, and the screen construction unit 108 and display control unit 109 are controlled in order to display a message that the program was already reserved by another user, as shown in FIG. 16, on the display unit 112 (S1405). If it is judged that the program is not still reserved, the flow advances to Step S1406.

At Step S1406, the program information with the user ID is stored in the reserved/recorded program table. In this case, even if the program was already reserved by the other user and the program information is stored in the reserved/recorded program table, the program information with the new user ID is stored in the reserved/recorded program table.

At Step S1407 it is checked whether it is the broadcasting start time of the reserved program stored in the reserved/recorded program table. If it is judged that it is the broadcasting start time, the tuner unit 101 is instructed to tune in the channel and VTR 201 is instructed to start recording the program (S1408).

At Step S1409 it is checked whether it is the broadcasting end time of the reserved program stored in the reserved/recorded program table. If it is judged that it is the broadcasting end time, VTR 201 is instructed to terminate recording the program (S1410). At Step S1411, the status parameter in the reserved/recorded program table is changed from "reserved" to "recorded". If the program is reserved by a plurality of users, all the status parameters of the program are chanced to "recorded".

If it is judged at Step S1403 that the action corresponding to the action code is not program reservation, i.e., that the action is reproduction, then in accordance with the print result managing table and reserved/recorded table, VTR 201 is instructed to reproduce the program corresponding to the designated action code (S1412).

At Step S1413 it is checked whether the program reproduction is completed. If completed, the status parameter in the reserved/recorded program table is changed from "recorded" to "reproduced" (S1414).

As above, in this embodiment, a code is assigned for a program reservation or a reproduction operation for each program desired by a user. Therefore, the program reservation or reproduction operation can be performed by a simple user operation.

Also in this embodiment, information on preferred programs is printed out together with a program reservation code and a program reservation is effected by inputting the code. Accordingly, it is not necessary to display a program list on the screen, so that a program selection and program reservation can be effected without hindering program listening/viewing.

Also in this embodiment, the signal processing apparatus assigns a preferred program with a specific code. It is therefore possible to reduce the number of codes, so that the program reservation and reproduction operation can be effected with a simple user operation.

Also in this embodiment, the preferred program search process is executed by reflecting the print history of programs upon the search process. It is therefore possible to exclude the program from the search object, because although it was printed in the past, the user does not prefer it. Programs preferred by a user can be searched from more search candidates.

Also in this embodiment, the program list is printed out. Therefore, a larger amount of detailed information can be printed out at a time than the program list is displayed, and a user can confirm the program contents easily.

Also in this embodiment, the preferred program search process, search condition setting, code assignment for program reservation and reproduction, and control management are executed for each user. Therefore, even if a plurality of users use the signal processing apparatus, program reservation and reproduction can be performed with a simple operation like the case of a single user.

In this embodiment, although a recommended program list is automatically printed, the recommended program list may be displayed on the display screen. In this case, the operation unit 114 or remote controller 116 is provided with a print button and as a user depresses the print button to print out a desired program list.

In this embodiment, in the preferred program search process, each program is rated and given a score in accordance with a plurality of search conditions, and programs having higher scores are selected. The embodiment is not limited only to this search method, but a search method using only the past listening/viewing history, a search method using only the search conditions set on the recommended program list setting screen, or other search methods may also be used.

In this embodiment, each program is rated and given a score in accordance with a plurality of search conditions, top 15 programs having higher scores are selected as those scheduled to be broadcast in the future, and top 5 programs having higher scores are selected as those already recorded. The number of programs selected as the search results is not limited only to the above, but it may be a desired number.

In this embodiment, each program is assigned a code of three digits from 000 to 255. The number of digits of the code is not limited only to this range, but the desired number of digits and a desired number range may also be used.

In this embodiment, the preferred program search process and sequential code assignment are performed for both the programs scheduled to be broadcast in the future and the programs already recorded, and the results are printed out at a time. The preferred program search process and sequential code assignment may be performed for ones of the programs scheduled to be broadcast in the future and the programs already recorded, and the results of only ones of the programs may be printed out.

A code is assigned to the program reservation operation for the programs scheduled to be broadcast in the future and to the reproduction operation for the programs already recorded. The operation to be assigned the code is not limited only to these operations, but other optional operations may be used such as a program detailed information display operation for confirming the detailed contents of a program and a listening/viewing reservation operation such as illustrated in FIG. 18A.

Although IEEE 1394 is used for connection to an external apparatus, the embodiment is not limited only thereto, but other bus systems or network systems may also be used.

Although the digital TV receiver of this embodiment has the display unit and speaker, it may be structured to output video and audio signals to an external display unit and speaker.

Although the digital TV receiver of this embodiment is not provided with a recording unit for recording received signals, it may be provided with the recording unit for recording received signals.

Although received signals are recorded in VTR connected to the signal processing apparatus, the embodiment is not limited only thereto, but received signals may be recorded in a built-in memory or in other recording apparatuses.

In this embodiment, although TV signals are used, other signals may also be used such as audio signals, signals supplied via a network.

In this embodiment, the invention is applied to the digital TV receiver. The invention is also applicable to other signal processing apparatuses and systems having a plurality of functions, with similar expected advantageous effects.

For example, the preferred program search process and the action code assignment process may be executed at a server on the network. In this signal processing system, a digital TV receiver receives information (code information) on the assigned action contents and action code corresponding to each program, and in accordance with the action code entered by a user and the code information, a process designated by the user is executed.

As described so far, according to the present invention, in a signal processing apparatus and method having a plurality of functions, a control operation for each function can be easily and reliably performed without a complicated user operation.

According to the present invention, control operations such as program reservation, listening/viewing reservation, reproduction, and program detailed information display for a preferred program of a user can be executed with a simple user operation.

What is claimed is:

1. A signal processing apparatus, comprising:
   a processing unit adapted to execute a plurality of processes;
   an assigning unit adapted to automatically assign each process with a unique code used for executing each of the plurality of processes;
   a control unit adapted to control said processing unit to execute the plurality of processes in accordance with the code assigned by said assigning unit;
   an input unit adapted to input program data and program information of the program data; and
   a searching unit adapted to search the program information input by said input unit in accordance with a predetermined search condition, wherein said searching unit adds a search point if a program matches a search condition and selects a program having a high search point; and
   wherein the search condition includes a condition that the search point lowers more as the number of assignment times of the code by said assigning unit for the plurality of processes is larger.

2. A signal processing method, comprising:
   a processing step of executing a plurality of processes by a processing unit;
   an assigning step of automatically assigning each process with a unique code used for executing each of the plurality of processes;
   a control step of controlling the processing unit to execute the plurality of processes in accordance with the code assigned by said assigning step;
   an input step of inputting program data and program information of the program data; and
   a searching step of searching the program information input in said input step in accordance with a predetermined search condition, wherein said searching step adds a search point if a program matches a search condition and selects a program having a high search point; and
   wherein the search condition includes a condition that the search point lowers more as the number of assignment times of the code in said assigning step for the plurality of processes is larger.

* * * * *